UNITED STATES PATENT OFFICE 2,223,974

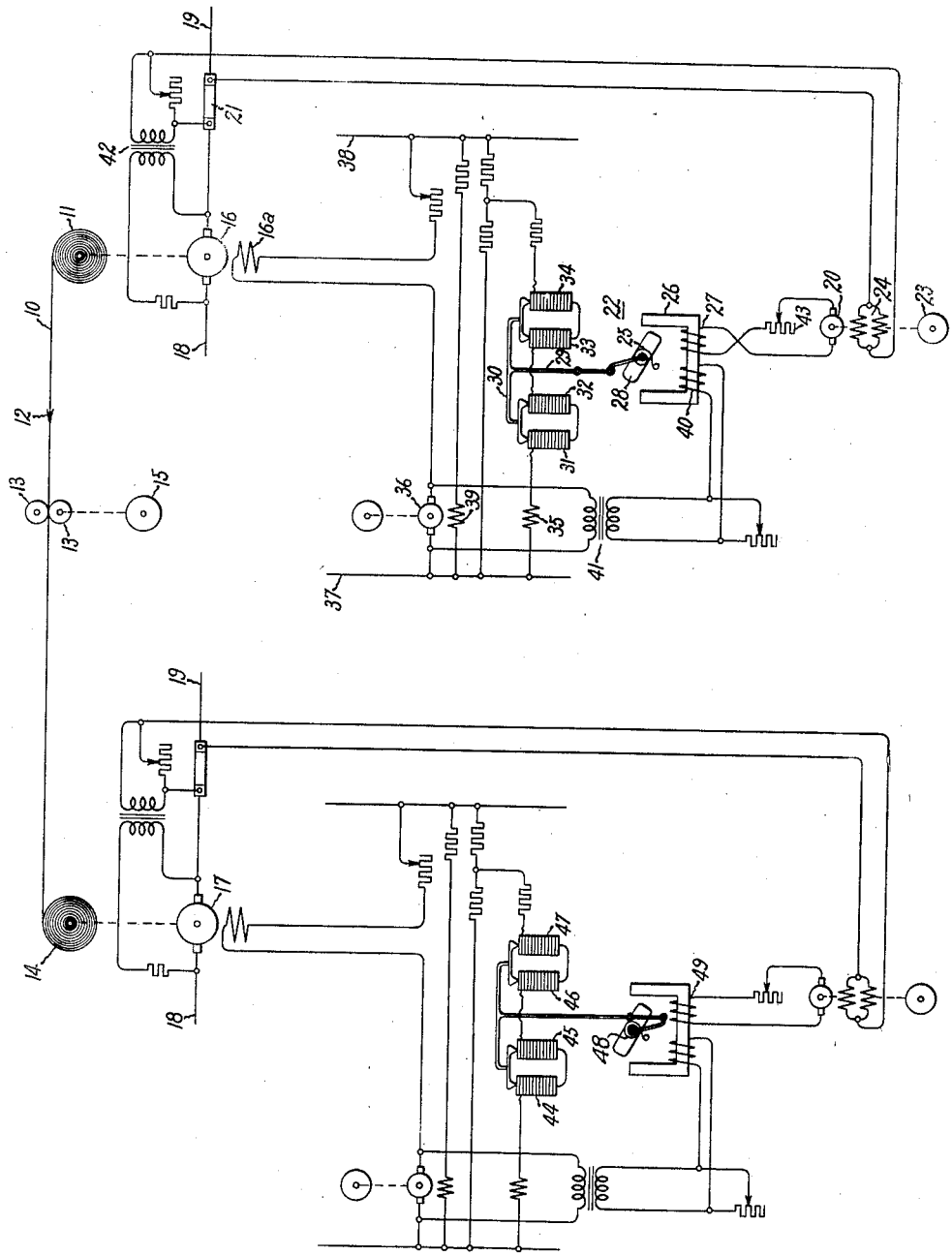

CONTROL SYSTEM

Louis W. Thompson and Francis Mohler, Schenectady, N. Y., assignors to General Electric Company, a corporation of New York Application August 11, 1938, Serial No. 224,332

9 Claims. (Cl. 242—75)

This invention relates to control systems, more particularly to systems for controlling the operations of dynamoelectric machines utilized for driving and controlling apparatus having an element for performing an operation on a length of material, and it has for an object the provision of a simple, reliable, and improved system of this character.

More specifically, the invention relates to systems for controlling apparatus such as rolling mills and the like, in which a dynamoelectric machine is mechanically coupled to an element for performing an operation on a length of material such as a roll for reducing the cross-section of the material, a paying-out reel for supplying the material to the rolls, or a take-up reel for winding the material to form a coil, and a more specific object of the invention is the provision of improved means for maintaining the tension of the material substantially constant during such operations.

In carrying the invention into effect in one form thereof, a dynamoelectric machine is mechanically coupled to the element which performs the operation on the material and operates either as a motor to drive the element or as a generator driven by the element. A generator is also provided, together with means responsive to a change in the tension of the material for effecting a corresponding change in the voltage of the generator, and means responsive to this change in the generator voltage are provided for controlling the dynamoelectric machine so as to counteract the original change in the tension, thereby to maintain the tension in the material substantially constant.

In illustrating the invention in one form thereof, it is shown as embodied in a control system for the dynamo-electric machines of the reels of a cold strip steel rolling mill. It will be understood, however, that the invention also has applications to the control of the motors which drive the thickness reducing rolls and also has other industrial applications.

For a better and more complete understanding of the invention, reference should now be had to the following specification and to the accompanying drawing, the single figure of which is a simple, diagrammatical representation of an embodiment of the invention.

Referring now to the drawing, a length of material 10, such for example as a cold strip of steel, is unwound from the supply reel 11 and is drawn in the direction of the arrow 12 by the mill rolls 13. In passing between the mill rolls, the thickness of the material is reduced the desired amount and the material that emerges from the delivery side of the rolls 13 after its thickness has been reduced is wound upon the take-up reel 14.

The main rolls 13 are driven by any suitable means, such for example as the electric motor 15. This motor may be of any suitable type, but is preferably a direct-current motor and is preferably supplied from a suitable source of power, such for example as a variable voltage generator, whose voltage is adjusted as desired by varying the generator excitation.

A dynamoelectric machine 16 is connected to the reel 11 and a similar dynamoelectric machine 17 is connected to the reel 14. When the reel 11 is the paying-out, or supply reel, and is rotated by the unwinding strip, the dynamoelectric machine 16 operates as a generator driven by the reel, and the dynamoelectric machine 17 operates as a motor to drive the take-up reel 14 to wind up the strip. During the succeeding pass when the direction of travel of the strip 10 is reversed, the dynamoelectric machine 16 operates as a motor to drive the reel 11 as a take-up reel, and the dynamoelectric machine 17 operates as a generator driven by the supply reel 14. These two dynamoelectric machines 16 and 17 are connected to any suitable source of supply such as represented by the supply lines 18, 19. The source 18, 19 may be and preferably is the same source as that from which the mill motor 15 is supplied.

When the dynamoelectric machine 16 is operating as a generator driven by the reel 11, it returns energy to the system and maintains a back tension in the strip between the mill rolls 13 and the reel 11, and since at this time the dynamoelectric machine 17 is operating as a motor, it applies and maintains a tension between the take-up reel 14 and the mill rolls 13. During the reverse pass the back tension is maintained by the dynamoelectric machine 17 operating as a generator to return energy to the system, and similarly, tension between the rolls 13 and the reel 11 operating as a take-up reel is maintained by the dynamoelectric machine 16 operating as a motor.

In order that the quality and gage of the strip shall be uniform and the strip free from wrinkles, it is desirable that these tensions be maintained substantially constant at all speeds at which the mill operates, from complete standstill to top speed. For this purpose, the respective excitations of dynamoelectric machines 16, 17 are under the control of suitable tension regulating means. These tension regulating means are illustrated as means for maintaining the armature currents of the dynamoelectric machines 16, 17 substantially constant. Assuming the reel 11 to be the unwinding reel and the dynamoelectric machine 16 operating as a generator, the speed of machine 16 will of course increase as the diameter of the coil on the reel 11 decreases. Therefore, in order to maintain the strip tension between the mill rolls and the reel 11 substantially constant, it is necessary gradually to reduce the excitation of the machine 16 so as to maintain the armature current substantially constant. For any given armature voltage of machine 16, constant current corresponds to constant tension in the strip.

Similarly, as the diameter of the coil on the reel 14 builds up, the speed of dynamoelectric machine 17, operating as a motor, should be gradually decreased.

The means for maintaining the armature current of dynamoelectric machine 16 substantially constant comprises a generator 20, means 21, responsive to changes in the armature current of machine 16 for producing corresponding changes in the voltage of generator 20, together with regulating means 22 responsive to changes in the voltage of generator 20 for controlling the excitation of dynamoelectric machine 16 so as to counteract the original change of its armature current. Since the armature current of dynamoelectric machine 16 is a function of the tension of strip 10, it will be seen that the regulating means thus far described responds to a change in the tension of the material to counteract such changes.

Generator 20 is illustrated as a direct-current generator driven at a speed which is preferably substantially constant by suitable means such as an electric motor 23 supplied from a suitable source (not shown). The generator 20 is provided with a field winding 24 connected across the means 21 which is illustrated as a resistor connected in the armature circuit of dynamoelectric machine 16. The voltage drop across the resistor 21 changes with changes in the armature current of machine 16 and consequently, the excitation and voltage of generator 20 change in response to changes in the armature current of dynamoelectric machine 16, and as pointed out in the foregoing, in response to changes in the tension of the material 10.

Regulating means 22 comprises a current sensitive element of the torque motor type which is balanced against a spiral spring 25. The torque motor directly operates a wide range, quick acting rheostat. The stator of the torque motor comprises a U-shaped magnetic core 26 upon which is mounted a d—c coil 27. The rotor member is a bar type armature 28 of magnetic material mounted on a shaft between the poles of the stator core in such a way that the armature tends to align itself with the stator pole pieces when the coil 27 is energized. The spiral spring 25 mounted on the torque motor shaft tends to rotate the armature in a clock-wise direction.

The torque motor armature 28 is connected by a linkage 29 to the equalizing bar 30 which directly operates the rheostatic element as the armature rotates.

The torque motor armature has sufficient torque to counterbalance that exerted by the spiral spring and rheostatic element, and it is designed to hold the same current in the coil 27 regardless of the position of the rheostatic element. In other words, when the current in the coil 27 changes from the value which corresponds to the value of tension to be held, the armature rotates and changes the resistance of the rheostatic element. This continues until the current in coil 27 has been restored to the original value. The rotation of the armature then ceases and the armature remains in its last position until there is a further change in the tension.

The rheostatic element is composed of four stacks 31, 32, 33, 34 of a special non-metallic, resistance material. When the coil 27 is deenergized and the rotor 28 is held in the position illustrated by the spiral spring 25, minimum pressure is applied to the stacks 31 to 34, and the resistance of these stacks is maximum.

The stacks 31 to 34 are connected in series relationship in the circuit of the "buck" field winding 35 of a "buck-boost" exciter 36. The field winding 16a of dynamoelectric machine 16 is connected to a suitable supply source represented by the supply lines 37, 38, and the armature of the "buck-boost" exciter 36 is connected in series relationship with field winding 16a. As shown, exciter 36 is also provided with a "boost" field winding 39 which is connected to the supply source 37, 38. The bucking field winding 35, when fully excited, is relatively much stronger than the boosting field winding 39 and, therefore, predominates over the boosting field winding. When bucking field winding 35 is deenergized, exciter 36 acts as a boosting exciter and its voltage adds to the voltage of the source 37, 38. On the other hand, when the bucking field winding 35 is fully excited, its magnetomotive force predominates over the magnetomotive force of the boosting field winding 39 and the exciter acts as a bucking exciter to oppose the voltage of the source 37, 38 to weaken the excitation of field winding 16a of dynamoelectric machine 16.

A stabilizing winding 40 is provided on the U-shaped core member 26 of the constant current regulating means 22. This winding 40 is connected to the secondary winding of a transformer 41 whose primary winding is connected to the armature of the buck and boost exciter 36. Stabilizing winding 40 and transformer 41 constitute an anti-hunting means for regulating means 22.

It will be seen that if during the starting of the mill and reel 11 from rest, the strip tension is to be maintained at the same value as that at which it is maintained during operation at constant speed, the armature current of the dynamoelectric machine 16 must be reduced to allow the strip to accelerate the unwinding reel without increasing the tension in the strip 10. Similarly, during deceleration, the armature current must be increased in order to prevent loss of tension. This is accomplished by recalibrating the tension regulating means 22 in accordance with the rate of change of speed of the dynamoelectric machine 16 during acceleration to cause the regulator to hold less current in the armature circuit of the dynamoelectric machine 16 during acceleration and more current during deceleration. The means for recalibrating the regulator 22 is illustrated as comprising a transformer 42 having its primary winding connected across the armature of dynamoelectric machine 16 and having its secondary winding connected in series relationship with the resistor 21 in circuit with the field winding 24 of generator 20. When the speed of dynamoelectric machine 16, and therefore its voltage, is constant, no voltage is induced in the secondary winding of transformer 42 and consequently, the regulator 22 operates to hold the value of current in the armature circuit of dynamoelectric machine 16 which its calibrating resistor 43 is adjusted to hold. However, when the speed of dynamoelectric machine 16 is changing, its voltage is also changing and a voltage is induced in the secondary winding of transformer 42 which adds to the voltage drop across the resistor 21 or subtracts from it, depending upon whether the voltage is increasing or decreasing, and this secondary induced voltage has the effect of changing the calibration of the regulator 22.

The tension regulating means for the dynamoelectric machine 17 is identical with the regulating means 22 for dynamoelectric machine 16 with the single exception that the stacks 44, 45, 46, 47 are fully compressed by the spring 48, and their resistance is minimum when the operating coil 49 is deenergized, and consequently, a repetition of the description of the regulating means is unnecessary. The reason for reversing the action of the regulating means with respect to pressure on the stacks 44, 45, 46, 47 when the operating coil 49 is deenergized is to cause the regulator to respond to "motoring" operation instead of generating operation to which regulating means 22 responds.

With the foregoing understanding of the apparatus and its organization in the completed system, the operation of the system itself will readily be understood from the following detailed description:

Assuming that the strip 10 is being unwound from the reel 11 and passed in the direction of the arrow 12 to the mill rolls 13, the dynamoelectric machine 16 will operate as a generator and return power to the source 18, 19. If the tension in the strip 10 between the reel 11 and the rolls 13 should tend to increase as a result of the decreasing diameter of the coil and the increasing speed of the dynamoelectric machine 16, the current in the armature circuit of the machine 16 will correspondingly increase. This increased armature current produces an increased voltage drop across the resistor 21 which, in turn, increases the excitation of generator 20. The increased voltage of generator 20 increases the current flowing in the operating winding 27 of the regulating means 22, and this causes the rotor member 28 to rotate in a counterclockwise direction to compress the stacks 31 to 34 inclusive and to effect a corresponding increase in the current flowing in the bucking winding 35 of exciter 36. As a result, the net excitation of the exciter 36 is reduced, and this produces a corresponding decrease in the voltage of the exciter 36 which, in turn, reduces the excitation of the field winding of dynamoelectric machine 16. As a result, the armature current of dynamoelectric machine 16 is reduced and the tension in the strip 10 is correspondingly reduced. When the armature current of machine 16 is reduced to the value corresponding to the tension that is to be maintained in the strip 10, the current in the operating winding 27 of regulator 22 will be reduced to the value at which the regulator is balanced, and the regulator remains inactive until there is a further change in the armature current of machine 16. During the time that the voltage of the exciter 36 is changing, a voltage is induced in the secondary winding of the transformer 41 which is transmitted to the stabilizing winding 40 on the core member 26. The direction of the current in the stabilizing winding 40 when the armature voltage of exciter 36 is decreasing is such that the ampere turns of the winding 40 oppose the ampere turns of the main winding, and thereby cause the regulator to cease the action just before the current in the armature circuit of the machine 16 attains the value for which the current adjusting rheostat 43 is set, thereby to discount electrical inertia of the fields of the dynamoelectric machines and mechanical inertia of the regulating means.

If the tension on the strip 10 should decrease, the regulating means will function in an opposite manner to decrease the strength of the bucking field 35 and thereby to increase the voltage of the exciter 36 and the excitation of the dynamoelectric machine 16. The increasing voltage of the exciter 36 will induce a voltage of a polarity which is the opposite of that described in the preceding paragraph in the secondary winding of the transformer 41. As a result, a current will flow in the opposite direction in the winding 40, and the ampere turns of the winding 40 will add to the ampere turns of the operating winding 27, thereby to cause the regulating means to cease its action just before the increasing current in the operating winding 27 reaches the value for which the current adjusting rheostat 43 is set.

Thus it will be seen that any change in the tension of the strip 10, whether the change represents an increase in the tension or a decrease in the tension, causes the regulating means 22 to respond to control the excitation of the dynamoelectric machine 16 so as to counteract such change in the tension. From the foregoing it will be clear that as the diameter of roll 11 decreases, the speed of rotation of machine 16 increases, and consequently the excitation of field winding 16a must be correspondingly decreased in order that the tension of the material shall not be increased. As the speed of machine 16 increases, the armature current tends to increase, and the regulator functions in the manner described in the foregoing to decrease the excitation of the machine sufficiently to maintain the armature current substantially constant. Since the diameter of the roll decreases continuously until the roll is completely unwound, the armature 25 of the regulator also rotates continuously during this time to weaken the excitation of field 16a progressively to maintain the armature current substantially constant as the unwinding progresses.

When the reel 11 is being accelerated from rest during the starting operation, the voltage across the armature of the dynamoelectric machine 16 is increasing. This increasing voltage adds to the drop across the resistor 21 in the armature circuit and thus causes the regulator to hold less current in the armature of the dynamoelectric machine 16 so as to allow the strip to accelerate the unwinding reel without increasing the tension in the strip. Correspondingly, during deceleration the voltage across the armature of dynamoelectric machine 16 is decreasing and the voltage induced in the secondary winding of the transformer 42 subtracts from the voltage drop across the resistor 21, thereby causing the regulator to hold more current in the armature of dynamoelectric machine 16 so as to allow the unwinding reel to decelerate without losing the tension in the strip.

Since the dynamoelectric machine 17 operates as a motor when the dynamoelectric machine 16 is operating as a generator, the action of its regulating means is similar but opposite to that of the regulating means 22. That is to say, an increase in the armature current of dynamoelectric machine 17 causes the regulating means to increase the excitation of dynamoelectric machine 17, and a decrease in the armature current causes the regulating means to decrease the excitation of machine 17. Similarly, during acceleration the recalibrating means causes the regulator to hold a higher current in the armature of dynamoelectric machine 17 so as to accelerate the armature and the reel without losing tension in the strip between the reel 14 and the rolls 13, and during deceleration the recalibrating means causes the regulator to hold a lower current so that the tension is not materially increased beyond the desired value. Otherwise, the operation of the regulating means for dynamoelectric machine 17 is the same as the operation of the regulating means 22, and a repetition of the description of this operation is unnecessary.

Although in accordance with the provisions of the patent statutes this invention is described as embodied in concrete form and the principle of the invention is explained, together with the best mode in which it is now contemplated applying the principle, it will be understood that the elements and their connections are merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States, is:

1. A control system for apparatus having a tensioning element operating on a length of material and a dynamoelectric machine mechanically coupled to said element comprising in combination, a pilot generator, means controlled by a change in the tension of said material for effecting a corresponding change in the voltage of said pilot generator, means responsive to said change in said voltage for controlling the field excitation of said dynamoelectric machine to counteract said change in said tension.

2. A control system for apparatus having a tensioning element operating on a length of material and a main dynamoelectric machine mechanically coupled to said element comprising in combination, a pilot generator, means controlled by a change in the tension of said material for effecting a corresponding change in the voltage of said pilot generator, an auxiliary dynamoelectric machine having its armature connected in the field circuit of said main dynamoelectric machine, and means responsive to said change in voltage of said pilot generator for controlling said auxiliary machine thereby to control said main machine to counteract said change in tension.

3. A control system for apparatus having a tensioning element operating on a length of material and a main dynamoelectric machine mechanically coupled to said element comprising in combination, a pilot generator, means controlled by a change of the tension of said material for effecting a corresponding change in the voltage of said generator, an exciter having its armature connected in the field circuit of said main dynamoelectric machine, means responsive to said change in said voltage for controlling said exciter thereby to control said main machine to counteract said change in tension, and anti-hunting means controlled by said exciter for controlling said voltage change responsive means.

4. A control system for apparatus having tensioning element operating on a length of material and a dynamoelectric machine mechanically coupled to said element comprising in combination, a generator, means responsive to a change in the tension of said material for effecting a corresponding change in the voltage of said generator, an exciter having its armature connected in the field circuit of said dynamoelectric machine, and an electromagnetic device responsive to said change in said generator voltage for controlling the excitation of said exciter thereby to change the excitation of said dynamoelectric machine to counteract said change in tension.

5. A control system for apparatus having a tensioning element operating on a length of material and a dynamoelectric machine mechanically coupled to said element comprising in combination, a generator, means responsive to a change in the tension of said material for producing a corresponding change in the voltage of said generator comprising means responsive to the armature current of said dynamoelectric machine for controlling the excitation of said generator, an electromagnetic device responsive to said change in said generator voltage for controlling said dynamoelectric machine to counteract said change in said tension and means responsive to the rate of change of speed of said dynamoelectric machine for varying the excitation of said generator.

6. A control system for apparatus having a tensioning element operating on a length of material and a dynamoelectric machine mechanically coupled to said element comprising in combination, a generator, means responsive to a change in the armature current of said dynamoelectric machine for producing a corresponding change in the voltage of said generator, an exciter connected in the field circuit of said dynamoelectric machine, a regulating device responsive to said change in said generator voltage for controlling said exciter to control the excitation of said machine to counteract said change in said armature current thereby to hold the tension in said material substantially constant during constant speed operation of said machine, and means responsive to the rate of change of armature voltage of said dynamoelectric machine for controlling said generator excitation to change the armature current of said machine during acceleration and deceleration thereby to hold said tension substantially constant during acceleration and deceleration.

7. A control system for apparatus having a tensioning element operating on a length of material and a dynamoelectric machine mechanically coupled to said element comprising in combination, a generator, means responsive to a change in the armature current of said machine for producing a corresponding change in the voltage of said generator, an exciter connected in the field circuit of said dynamoelectric machine, a regulating device responsive to said change in said generator voltage for controlling said exciter to control the excitation of said machine to counteract said change in said armature current thereby to hold the tension of said material substantially constant, means responsive to the rate of change of armature voltage of said machine for controlling the excitation of said generator to modify the excitation of said machine to hold the tension of said material substantially constant during acceleration and deceleration and anti-hunting means controlled by said exciter for controlling said regulating device.

8. A control system for apparatus having a tensioning element operating on a length of material and a dynamoelectric machine mechanically coupled to said element comprising in combination, a generator, means responsive to a change in the armature current of said machine for producing a corresponding change in the voltage of said generator, an exciter connected in the field circuit of said dynamoelectric machine, a regulating device responsive to said change in said generator voltage for controlling said exciter to control the excitation of said machine to counteract said change in said armature current thereby to maintain the tension of said material substantially constant during constant speed operation, said regulating device having a variable resistance stack in the field circuit of said exciter, a core member and an operating coil on said core member connected to said generator and a mechanical connection between said core member and said stack, and anti-hunting means for said regulator comprising a second coil on said core member connected to said exciter.

9. A control system for apparatus having a tensioning element operating on a length of material and a dynamoelectric machine mechanically coupled to said element comprising in combination, a buck and boost exciter having its armature connected in the field circuit of said dynamoelectric machine, said exciter having a pair of magnetically opposed field windings, a generator, means responsive to a change in the armature current of said dynamoelectric machine for changing the excitation of said generator to effect a corresponding change in the generator voltage, electromagnetically actuated regulator means responsive to said generator voltage change for effecting a corresponding change in the voltage of said exciter comprising a pressure responsive resistance connected in circuit with one of said exciter field windings, and a torque motor for actuating said resistance, said torque motor having a U-shaped core member and an operating coil on said member connected to said generator, and means responsive to the rate of change of armature voltage of said dynamoelectric machine for controlling the excitation of said generator to recalibrate said regulator so as to maintain the tension of said material substantially constant during acceleration and deceleration of said dynamoelectric machine.

LOUIS W. THOMPSON.
FRANCIS MOHLER.